(12) United States Patent
Thesling (10) Patent No.: US 7,634,023 B2
(45) Date of Patent: Dec. 15, 2009

(54) ORTHOGONAL FREQUENCY DIGITAL MULTIPLEXING CORRELATION CANCELLER

(75) Inventor: William H. Thesling, Hudson, OH (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

(21) Appl. No.: 12/190,786

(22) Filed: Aug. 13, 2008

(65) Prior Publication Data

US 2008/0310548 A1 Dec. 18, 2008

Related U.S. Application Data (63) Continuation of application No. 10/910,868, filed on Aug. 4, 2004, now Pat. No. 7,426,242.

(60) Provisional application No. 60/492,412, filed on Aug. 4, 2003.

(51) Int. Cl.
   *H04L 25/03* (2006.01)
(52) U.S. Cl. ........... 375/296; 375/144; 375/146; 375/285; 370/203; 370/465; 370/482; 370/497; 455/114.2; 455/115.1

(58) Field of Classification Search ........... 375/144, 375/146, 260, 285, 295, 296, 298; 370/203, 370/206, 464, 465, 482, 497; 455/46, 59, 455/91, 103, 104, 109, 114.2, 114.3, 115.1
See application file for complete search history.

(56) References Cited

U.S. PATENT DOCUMENTS

| | | | |
|---|---|---|---|
| 4,185,168 A | 1/1980 | Graupe et al. | |
| 6,289,309 B1 | 9/2001 | deVries | |
| 6,404,806 B1 * | 6/2002 | Ginesi et al. | 375/222 |
| 6,754,340 B1 | 6/2004 | Ding | |
| 6,763,061 B1 | 7/2004 | Strait et al. | |
| 7,023,929 B2 | 4/2006 | Mujica et al. | |
| 7,085,314 B2 | 8/2006 | Zhu et al. | |
| 2003/0207669 A1 | 11/2003 | Kroeger | |
| 2004/0008793 A1 * | 1/2004 | Mujica et al. | |
| 2004/0014438 A1 * | 1/2004 | Hasarchi | |

* cited by examiner

*Primary Examiner*—Dac V Ha
(74) *Attorney, Agent, or Firm*—Townsend and Townsend and Crew LLP (57) ABSTRACT

A correlation canceller modulates a communication signal over a plurality of channels and an epoch aperture by a plurality of interference response signals corresponding to linear response by one or more filtering effects to generate an inversely correlated communication signal.

23 Claims, 7 Drawing Sheets

ORTHOGONAL FREQUENCY DIGITAL MULTIPLEXING CORRELATION CANCELLER

This application is a continuation of U.S. patent application Ser. No. 10/910,868, filed Aug. 4, 2004, entitled "ORTHOGONAL FREQUENCY DIGITAL MULTIPLEXING CORRELATION CANCELLER", which is hereby incorporated by reference in its entirety for all purposes.

The application claims the benefit of U.S. Provisional Application Ser. No. 60/492,412, filed Aug. 4, 2003, entitled "OFDM Correlation Canceller," the entire disclosure of which is incorporated herein by reference.

The disclosure in general relates to communication signal processing systems, and in particular relates to the addition of inverted interference signals to facilitate digital filtering.

Communication systems typically implement one or more digital modulation schemes. For example, many communication systems use an Orthogonal Frequency Digital Multiplexing (OFDM) modulation format. The OFDM modulation format supports multiple communication channels, and a 16-channel OFDM waveform is commonly implemented in satellite systems.

The 16-channel OFDM modulation format generates side lobe energy, as do nearly all other modulation formats. The side lobe components of the OFDM waveform are needed to maintain orthogonality. The side lobe energy of the OFDM spectrum, however, extends beyond the signal bandwidth typically allotted for a carrier waveform and may interfere with waveforms in adjacent frequency bands, causing adjacent channel interference (ACI). Thus, the side lobes are removed at the transmitter by a FIR filter to eliminate nearly all the side lobe energy and to limit the total bandwidth of the OFDM signal to a "null-to-null" bandwidth. Removal of the side lobes, however, compromises the orthogonal property of the OFDM waveform, causing inner symbol interference (ISI). This interference results in a higher noise floor (or Es/No ceiling), which, in turn, limits the system performance of each channel. The degradation appears as implementation loss, and may be particularly high when using high order modulation on the outer channels.

The digital filtering correlates the symbols in time and across channels, which results in a self-interference within the modulated waveform. A novel correlation canceller is disclosed herein that adds the inverse of this interference a priori. The inverse of the interference may be obtained based on known symbols for each channel within the transmitter. In one example embodiment, the correlation canceller modulates a processed data signal over a plurality of channels and an epoch aperture by a plurality of interference response signals corresponding to a digital filter transfer function to generate an inversely correlated communication signal.

DRAWINGS

FIGS. 9($a$) and 9($b$) are illustrative correlation canceller input filters for two communication channels;

DETAILED DESCRIPTION

Figure 1:
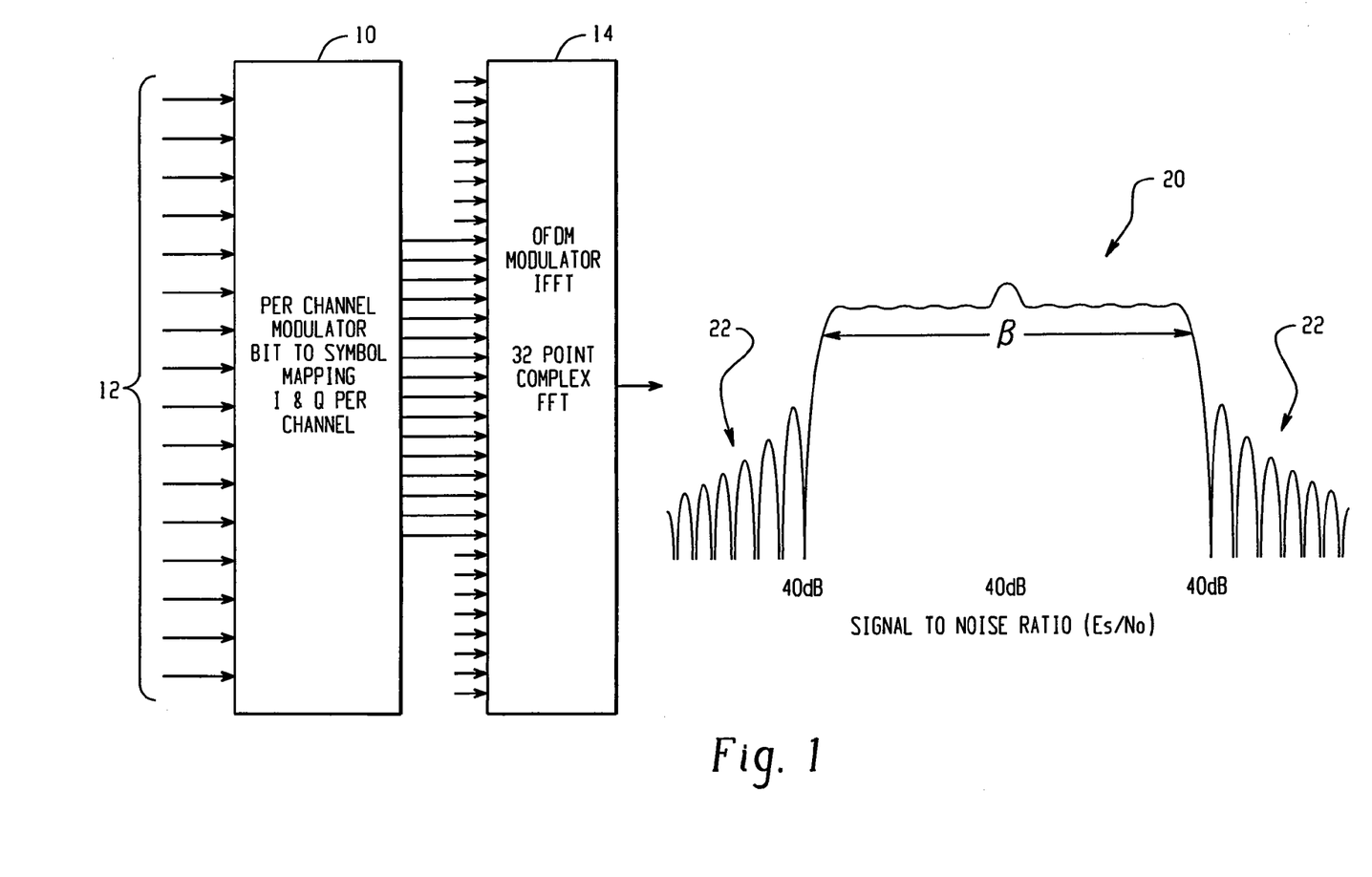
FIG. 1 is a block diagram of a system for generating a modulated and unfiltered communication signal.

FIG. 1 is a block diagram of a system for generating a modulated and unfiltered communication signal 20. A channel modulator 10 receives input bit streams 12 for a plurality of data channels and modulates the input bit streams 12 on each channel to produce a corresponding processed data signal comprising in-phase and quadrature components. In the example shown in FIG. 1, the channel modulator 10 modulates 16 data channels at a rate of 3.375 megasymbols per second (Msps). Other channel modulators having different specifications may also be used. The channel modulator 10 may comprise digital signal processing circuitry and/or software operable to encode the digital data into the in-phase and quadrature components. Examples of such circuitry and/or software include a field programmable gate array (FPGA), an application specific integrated circuit (ASIC), or a computer processor operable to execute processor-executable instructions.

A carrier modulator 14 receives the processed data signal from the channel modulator 10 and modulates the processed data signal to produce a communication signal. The communication signal may then be provided to a transmitter for transmission. In the example shown in FIG. 1, the carrier modulator 14 is an OFDM modulator that performs a 32 point complex fast Fourier transform (FFT). In this example the data is FEC encoded via turbo codes, and the output waveform is referred to as a "Turbo-encoded Orthogonal L-Band L-Code" (or a "TOLL") communication signal 20. Other carrier modulators having different specifications may also be used, such as BPSK, QPSK, M-ary PSK, or other such modulation formats, with or without FEC encoding. The carrier modulator 14 may comprise digital signal processing circuitry and/or software operable to perform such carrier modulation. Examples of such circuitry and/or software include a FPGA, an ASIC, or a computer processor operable to execute processor-executable instructions.

The communication signal 20 comprises the 16 multiple channels of the processed data signal, each of which is at a symbol rate of 3.375 Msps. The sixteen channels are multiplexed together, generating a 54 Msps band signal. Thus, the bandwidth β of the communication signal 20 is 54 MHz.

In the example shown, the TOLL communication signal has a very high signal-to-noise ratio (Es/No) of 40 dB for each channel. This high Es/No value is seen in the TOLL waveform 20 prior to filtering by a digital filter and transmission, and is due in part to demodulation in the presence of the side lobes 22 appearing outside of the 54 MHz band. In a practical system, however, the bandwidth available for a communication signal is limited. For example, the waveform 20 may be one of a plurality of communication signals that are adjacently positioned along the frequency spectrum. Accordingly, because the side lobes 22 are outside of the 54 MHz band of the TOLL waveform, they may cause adjacent channel interference (ACI) in the communication signals in adjacent bands. Thus, prior to transmission, the communication signal 20 is filtered by a digital filter to suppress the side lobes 22.

Figure 2:
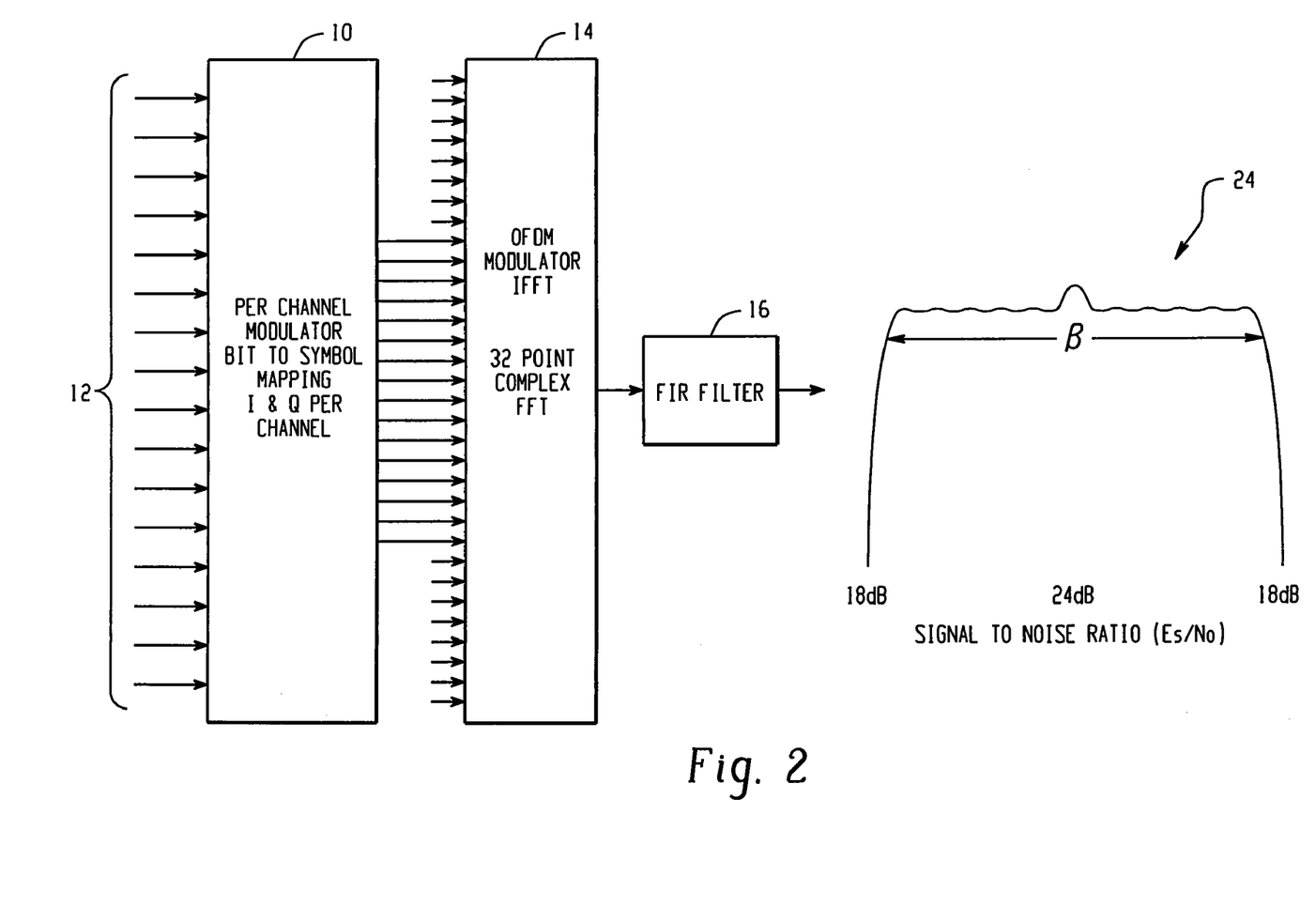
FIG. 2 is a block diagram of a system for generating a modulated and filtered communication signal.

FIG. 2 is a block diagram of a system for generating a modulated and filtered communication signal 24. The channel modulator 10 and the carrier modulator 14 are the same as described in FIG. 1. The system of FIG. 2, however, includes an example finite impulse response (FIR) filter 16. Other types of filters may also be used.

The FIR filter 16 eliminates the side lobes 22 of the communication signal 20 to generate the filtered communication signal 24 of FIG. 2. Because nearly all of side lobe energy outside of the 54 MHz band is eliminated, the filtered communication signal 20 generates less ACI than the communication signal 20. However, suppression of the side lobes 22 compromises the orthogonality of the communication signal 20, which in turn results in inner symbol interference (ISI). As a result, the effective Es/No of the filtered communication signal is lowered to about 18 dB at the outer channels.

In general, the Es/No ceiling is indicative of an implementation loss, and raising the Es/No ceiling mitigates the implementation loss. The amount of the implementation loss depends on the modulation and coding used. For example, if a rate ⅓ code with QPSK is used on the outer channels of the filtered communication signal 24, the implementation loss may be less then 0.1 dB and can easily be neglected. However, if an 8-ary modulation and a high rate code (such as the $(128,120)^2$ turbo product code) is used, then the implementation loss increases to approximately 0.7 dB. When other impairments are included, the difference in implementation loss when using the FIR filter 16 as compared to not using the FIR filter 16 can easily exceed 1.0 dB. Even on the inner channels, near the center frequency, the implementation loss can approach nearly 0.5 dB when the higher code rate codes and 8-ary modulation are used.

Figure 3:
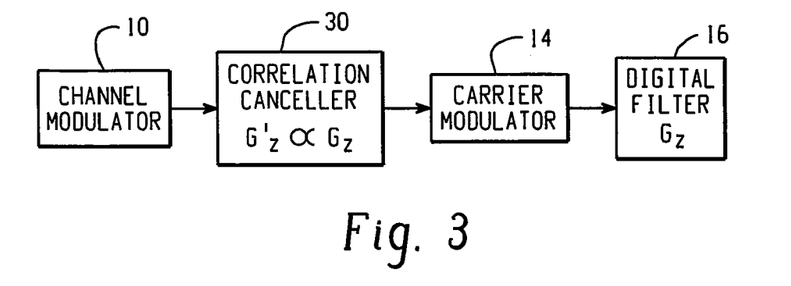
FIG. 3 is a block diagram of a system for providing a priori conditioning of a communication signal.

The system degradation caused by the filtering of the communication signal can be minimized by evaluating a self-interference caused by the inclusion of the filter and adding an inverse of this interference a priori. FIG. 3 is a block diagram of a system for providing a priori conditioning of a communication signal. The example channel modulator 10, carrier modulator 14, and digital filter 16 are as described with respect to FIGS. 1 and 2 above.

A correlation canceller 30 is interposed between the channel modulator 10 and the carrier modulator 14. The correlation canceller 30 includes a plurality of interference response signals corresponding to the transfer function Gz of the digital filter 16. The interference response signals define an epoch aperture over which the in-phase and quadrature data are received. The epoch aperture is typically symmetric about an on-time received symbol, e.g., the epoch aperture may define the time t=−n, −n+1 . . . n over which in-phase and quadrature data signals are received. Thus, the transfer function of the correlation canceller 30 may be characterized as G'z. The correlation canceller 30 is operable to modulate the processed data signal from the channel modulator 10 over the plurality of channels and the epoch aperture prior to digital filtering by the digital filter 16 to generate an inversely correlated data signal. In the example system shown in FIG. 3, the inversely correlated data signal is received by the carrier modulator 14, which then modulates the inversely correlated data signal to generate a communication signal. The communication signal is then filtered by the digital filter 16.

In general, FIR filtering of a communication signal correlates symbols in time and across the channels, which results in self-interference across the channels. By filtering a processed data signal with known data, such as data stream representing a test tone or a response to an impulse function, the channel responses to the self-interference caused by the FIR filter may be evaluated. The inverse of this self-interference may be characterized as interference response signals that can be added into the processed data signal a priori to minimize the effect of the self-interference caused by the correlation in the FIR filter. Accordingly, the addition of the interference response signals results is a degree of correlation cancellation relative to the self-interference.

The correlation canceller 30 may comprise digital signal processing circuitry and/or software operable to perform such carrier modulation. Examples of such circuitry and/or software include a FPGA, an ASIC, or a computer processor operable to execute processor-executable instructions.

Figure 4:
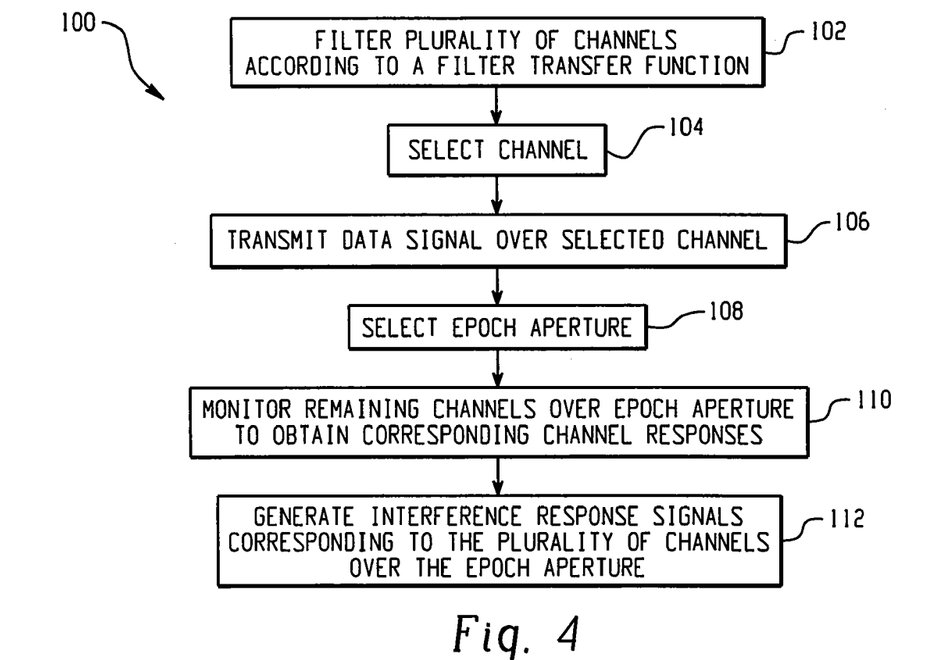
FIG. 4 is flow diagram illustrating a method of a priori conditioning of a communication signal.
Figure 5:
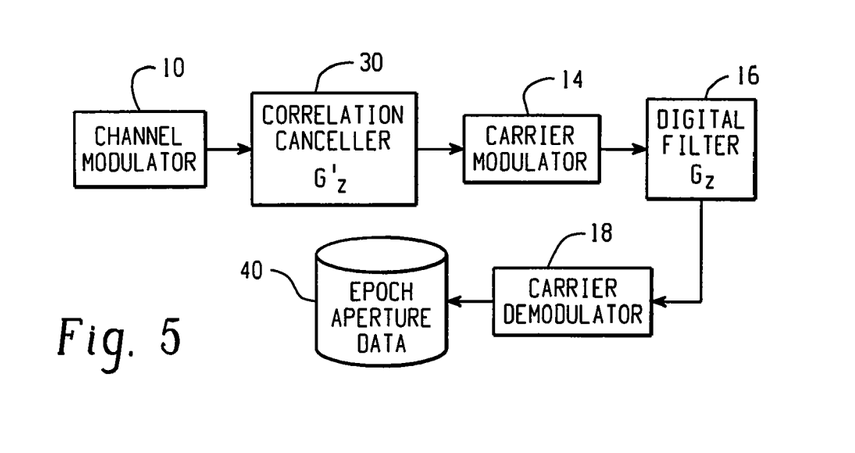
FIG. 5 is a block diagram of a system for monitoring epoch aperture data.

FIG. 4 is flow diagram 100 illustrating a method of a priori conditioning of a communication signal. The process of FIG. 4 may be carried out to generate the interference response signals utilized by the correlation canceller 30 of FIG. 3. An example system implementing the process of FIG. 4 is shown in FIG. 5, which depicts a system for monitoring epoch aperture data.

Step 102 filters a plurality of channels according to a filter transfer function, and step 104 selects one of the data channels. Step 106 transmits a data signal over the selected channel. The data signal may be a known value, such as a tonal that generates a known bit pattern for the in-phase and quadrature data.

Step 108 selects an epoch aperture for monitoring. The size of the epoch aperture may be selected according to the processing capabilities available, and also according to the acceptable amount of self-interference mitigation desired or required. In one embodiment, an epoch aperture of three (i.e., n−1, n, and n+1, where n represents the on-time symbol) is selected.

Step 110 monitors the remaining plurality of channels over the epoch aperture to obtain corresponding channel response signals resulting from the transmission of the data signal over the selected channel. The channel response signals are the interference data on each remaining channel in response to the transmission of the data signal over the selected channel. As shown in FIG. 5, this step may be realized by using a demodulator 18 to demodulate the filtered communication signal output by the digital filter 16. The epoch aperture data 40 are stored in a data store, such as a memory device.

Steps 102, 104, 106, 108 and 110 are then repeated for each channel in the processed data signal. After each channel has been selected and the corresponding epoch aperture data 40 collected, a measure of the self-interference across each channel for the epoch aperture is obtained. Step 112 then inverts the channel response signals to obtain interference response signals corresponding to the plurality of channels over the epoch aperture.

In one embodiment, the in-phase and quadrature components of each channel are evaluated separately and the corresponding channel response signals comprise real data. In this embodiment, the resulting interference response signals are the negative of the channel response signals. In another embodiment, the complex channel response data may be monitored and used to generate the corresponding interference response signals.

Figure 6:
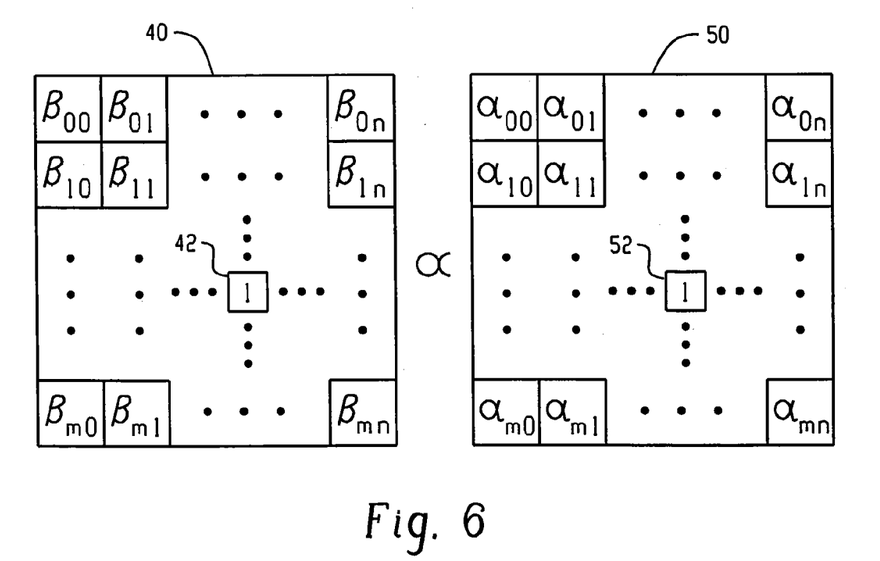
FIG. 6 is a block diagram of epoch aperture data and corresponding interference response signals.

FIG. 6 is a block diagram of epoch aperture data 40 and corresponding interference response signals 50 for a single channel corresponding to the unity value 42. The example epoch aperture data 40 defines an epoch aperture of n received channel responses over m modulated channels. An inversion operation, such as multiplying the n received channel responses by −1, may be used to generate the corresponding interference response signals 50. The unity value 42, however, is not inverted, as represented by the unity value 52 in the interference response signals 50. This is to prevent cancellation of the actual data transmitted over a channel.

Figure 7:
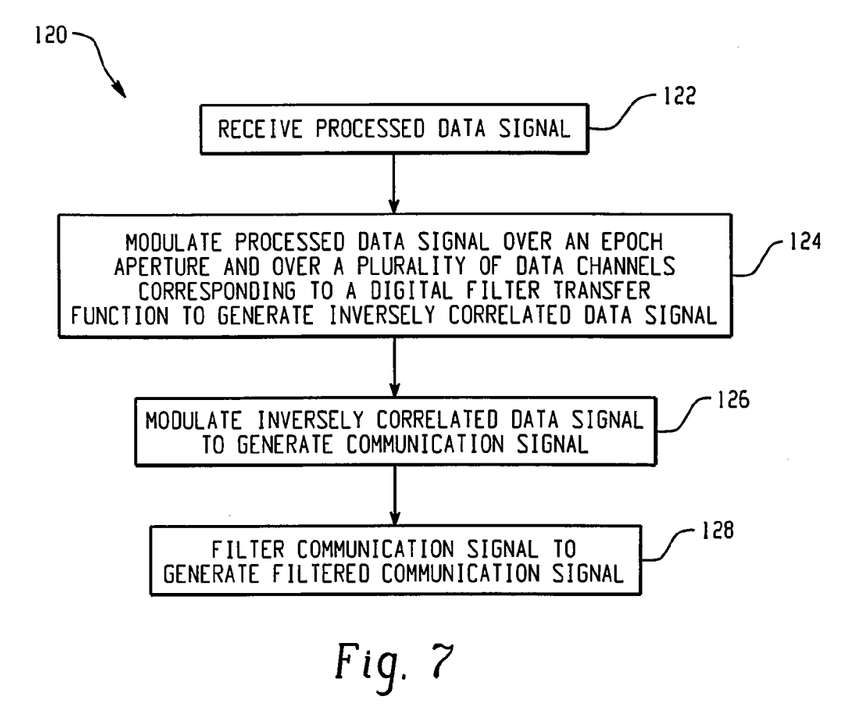
FIG. 7 is a flow diagram illustrating a method of generating a filtered communication signal modulated by interference response signals.

FIG. 7 is a flow diagram 120 illustrating a method of generating a filtered communication signal modulated by interference response signals. The system of FIG. 3 may be used to implement the process of FIG. 7. In step 122, the correlation canceller 30 receives a processed data signal from the channel modulator 10. In step 124, the correlation canceller 30 modulates the processed data signal over the plurality of channels and the epoch aperture prior to digital filtering to generate an inversely correlated data signal. The correlation canceller 30 modulates the processed data signal by the interference response signals. In step 126, the inversely correlated data signal is modulated by the carrier modulator 14 to generate a communication signal. The communication signal is then filtered by the digital filter 16 to generate a filtered communication signal in step 128.

Figure 8:
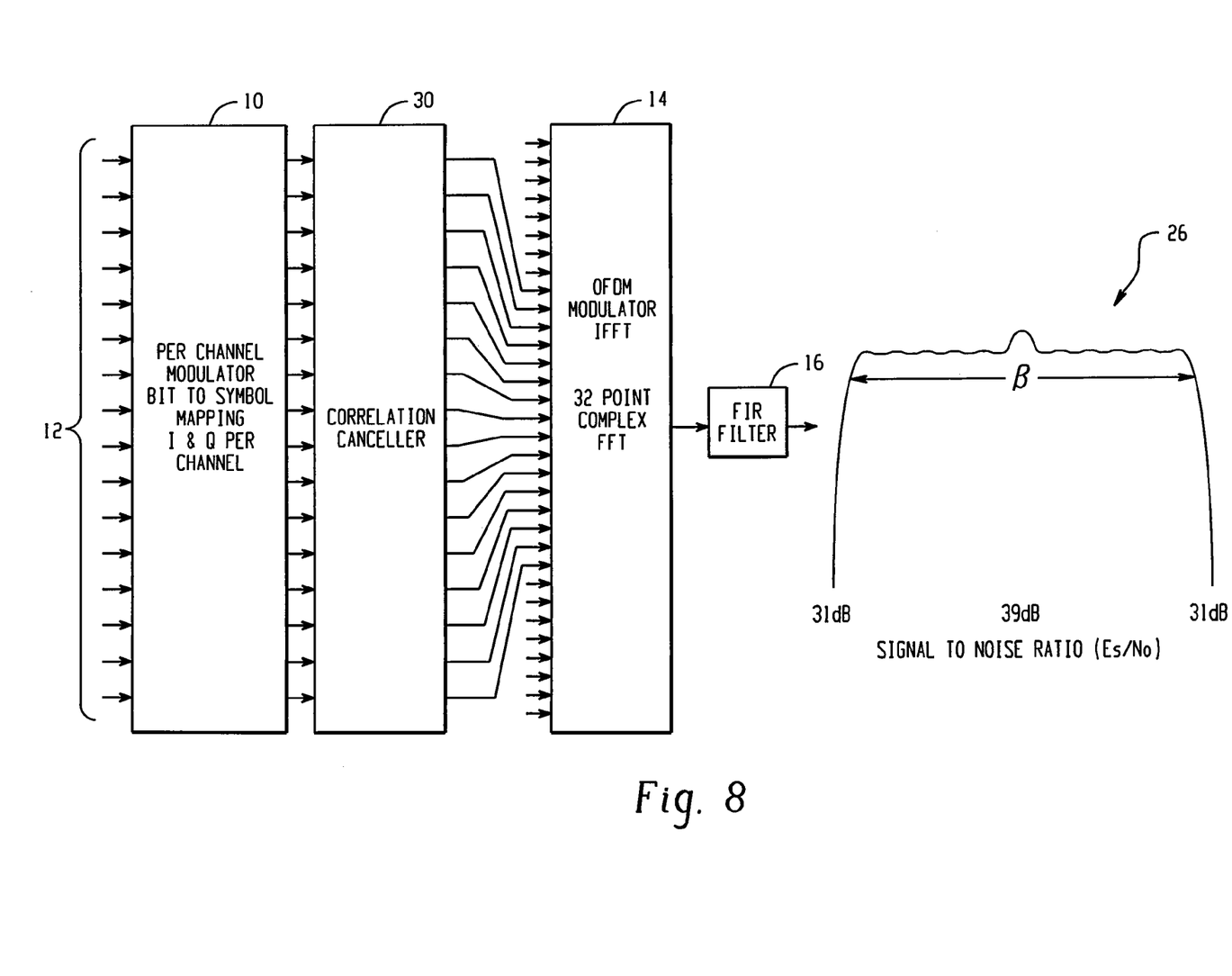
FIG. 8 is a block diagram of an example correlation canceller system for generating a modulated and filtered communication signal.

FIG. 8 is a block diagram of an example correlation canceller system for generating a modulated and filtered communication signal 26. The channel modulator 10, carrier modulator 14, and the FIR filter 16 are the same as described in FIG. 2. The system of FIG. 8, however, includes a correlation canceller 30 interposed between the channel modulator 10 and the carrier modulator 14.

The example system of FIG. 8 is described with reference to a filtered 2-channel (channel 0 and channel 1) OFDM waveform using the FIR filter 16 with a 2-symbol aperture. Each channel carries an I and a Q value for a total of 4 variables—one I and Q per channel—received at any time n. Due to the FIR filtering by the FIR filter 16, the channel 0 in-phase term I at the receiver can be written as:

$$I_{Rec,0,n} = c_{0I,0I,0}I_{0,n} + c_{0I,0I,-1}I_{0,n-1} + c_{0I,0I,+1}I_{0,n+1} +$$
$$c_{0I,0I,-2}I_{0,-2} + c_{0I,0I,+2}I_{0,n+2} + c_{0I,0Q,0}Q_{0,n} +$$
$$c_{0I,0Q,-1}Q_{0,n-1} + c_{0I,0Q,+1}Q_{0,n+1} + c_{0I,0Q,-2}Q_{0,-2} +$$
$$c_{0I,0Q,+2}Q_{0,n+2}$$
$$= c_{0I,1I,0}I_{1,n} + c_{0I,1I,-1}I_{1,n-1} + c_{0I,1I,+1}I_{1,n+1} +$$
$$c_{0I,1I,-2}I_{1,-2} + c_{0I,1I,+2}I_{1,n+2} + c_{0I,1Q,0}Q_{1,n} +$$
$$c_{0I,1Q,-1}Q_{1,n-1} + c_{0I,1Q,+1}Q_{1,n+1} + c_{0I,1Q,-2}Q_{1,-2} +$$
$$c_{0I,1Q,+2}Q_{1,n+2}$$

where:

$I_{Rec,0,n}$=the in-phase value received on channel 0 at time n; and $c_{ChX,M,ChYN\ldots-\alpha}$=the correlation of the $N^{th}$ term of channel Y at time n−α on the $M^{th}$ term of channel X at time n, where N and M∈(I, Q).

For channel 0, there are 20 terms for just the received in-phase term. Similarly, there are 20 terms for the quadrature term of channel zero, the in-phase term of channel 1, and the quadrature term of channel 1. In an ideal system, the first coefficient ($c_{0I,0I,0}$) for each received signal is 1 and all other coefficients are zero.

The FIR filtering by the digital filter 16, however, causes interference resulting in the additional terms being non-zero. Each of these other terms is typically small relative to the first coefficient ($c_{0I,0I,0}$) but the RMS sum of all 20 becomes significant.

In a system implementing a TOLL waveform, there are 16 channels and the aperture of the FIR filter 16 is approximately three symbols. Thus, for each of the in-phase and quadrature values (16 I and 16 Q) there are 7×32=224 terms, or 223 additional terms. Accordingly, the correlation canceller 30 calculates the sum of the 223 additional terms and subtracts this value from the modulated symbol. If calculated for each symbol, the correlation canceller 30 generates 223×32=7136 terms per symbol time of 3.375 Msps.

The coefficients c, however, are a function of the FIR filter 16. As a result, the coefficients c are a function of the number of channels used. For a system using a selected number of channels and a selected FIR filter 16, the coefficients c are constants. Multiply-accumulators may thus be implemented because each term in the above equation requires a multiply and these terms are added together. Thus, in the example embodiment of FIG. 8, the correlation canceller 30 has a similar characteristic of 32 FIR filters, each with 223 taps. Therefore, the total MAC operations per second of the correlation canceller is 7136×3.375 Msps=24 billion MAC operations per second. As a comparison, a typical FIR filter that may be used in the system of FIG. 8 may be implemented with 5 Billion MACs.

In another embodiment, the implementation requirements of the correlation canceller 30 can be reduced by minimizing the MAC operation requirements. For example, reducing the aperture size reduces the MAC operations required. The FIR filter 16 aperture results in 7 time periods per each symbol. As with most filters, however, the bulk of the signal energy is concentrated near the "on time" symbol. Thus, the three terms centered about the on-time symbol may be used to define an aperture that yields acceptable results. Therefore, for a time n, only the symbols at time n−1, n and n+1 are considered, and the remaining symbols are ignored. The total MAC operations are reduced to approximately 10.4 billion, which can be implemented in a FPGA or ASIC.

Utilization of an epoch aperture of n−1, n and n+1 in the correlation canceller 30 thus increases the minimum Es/No to approximately 31 dB at the outer channels, as shown by the filter communication signal 26 of FIG. 8. This Es/No level is sufficiently high that the implementation loss on any channel can generally be neglected.

Figure 9A:
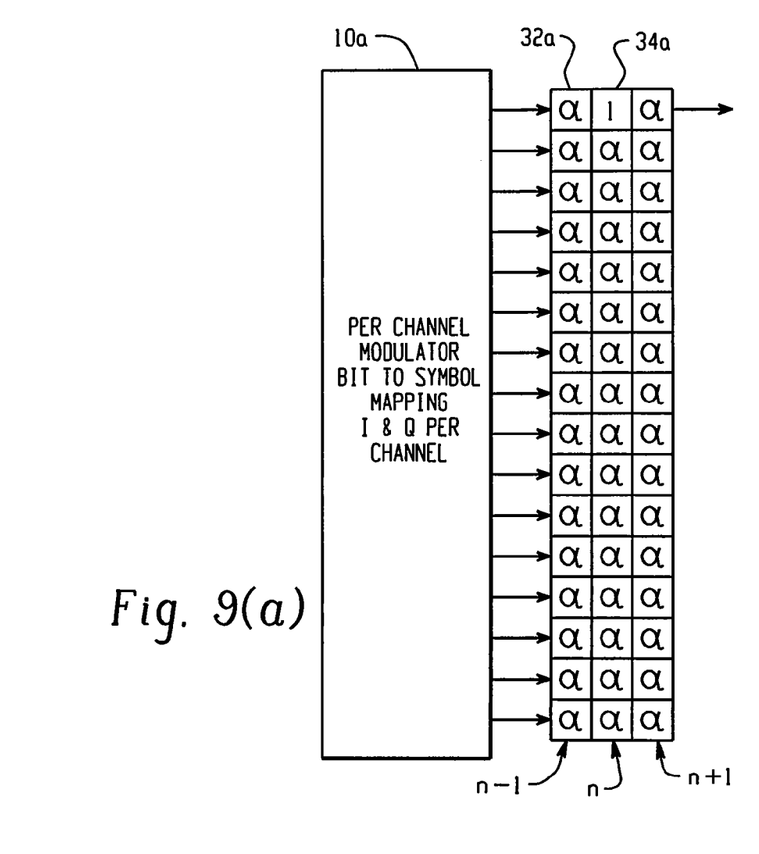
Figure 9B:
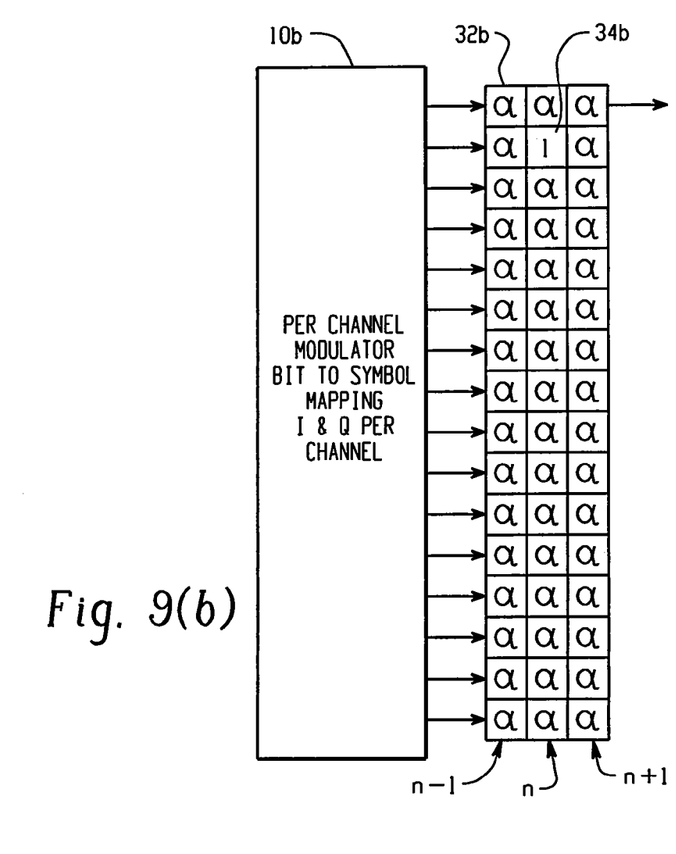

FIGS. 9(a) and 9(b) are illustrative correlation canceller input filters 32a and 32b for two communication channels 10a and 10b. In the embodiment shown in FIGS. 9(a) and 9(b), the in-phase and quadrature values are represented together as a single complex number. For the first channel having the corresponding input filter 32a, the output is the weighted sum of the channel at time n, represented by the unity value of "1" for the interference response signal coefficient 34a, and all 16 channels at time n−1, n and n+1 as modulated by the remaining interference response signal α coefficients. Likewise, for the second channel having the corresponding input filter 32b, the output is the weighted sum of the channel at time n, represented by the unity value of "1" for the interference response signal coefficient 34b, and all 16 channels at time n−1, n and n+1 as modulated by the remaining interference response signal a coefficients.

The α values represent different complex weights and have a magnitude less than 1. The correlation canceller 30 thus operates to add in, a priori, the inverse of the correlation caused by the FIR filter 16. The result is that cross channel correlation seen at the receiver is minimized.

Because the correlation canceller 30 may be interposed between the channel modulator 10 and the carrier modulator 14, the systems and methods described herein may be readily implemented in existing communication systems. Additionally, if the FIR filter is changed or adjusted to have a different transfer characteristic, the interference response signals utilized by the correlation canceller 30 may be obtained by the analysis of the channel response data as described above with reference to FIGS. 4, 5 and 6. Finally, if the FIR filter 16 is removed from the system, or if the correlation canceller 30 is to be bypassed, all of the remaining interference response signals a may be set to 0.

Figure 10:
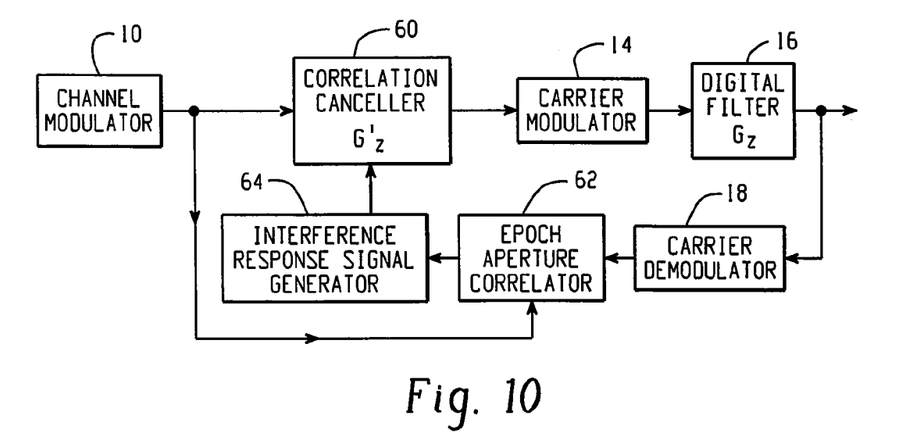
FIG. 10 is a block diagram of another embodiment of a system for generating a modulated and filtered communication signal.

FIG. 10 is a block diagram of another embodiment of a system for generating a modulated and filtered communication signal. In this embodiment, a plurality of interference response signals are generated by an epoch aperture correlator 62 and an interference response signal generator 64. The system of FIG. 10 provides for dynamic adjustment of a correlation canceller 60.

Figure 11:
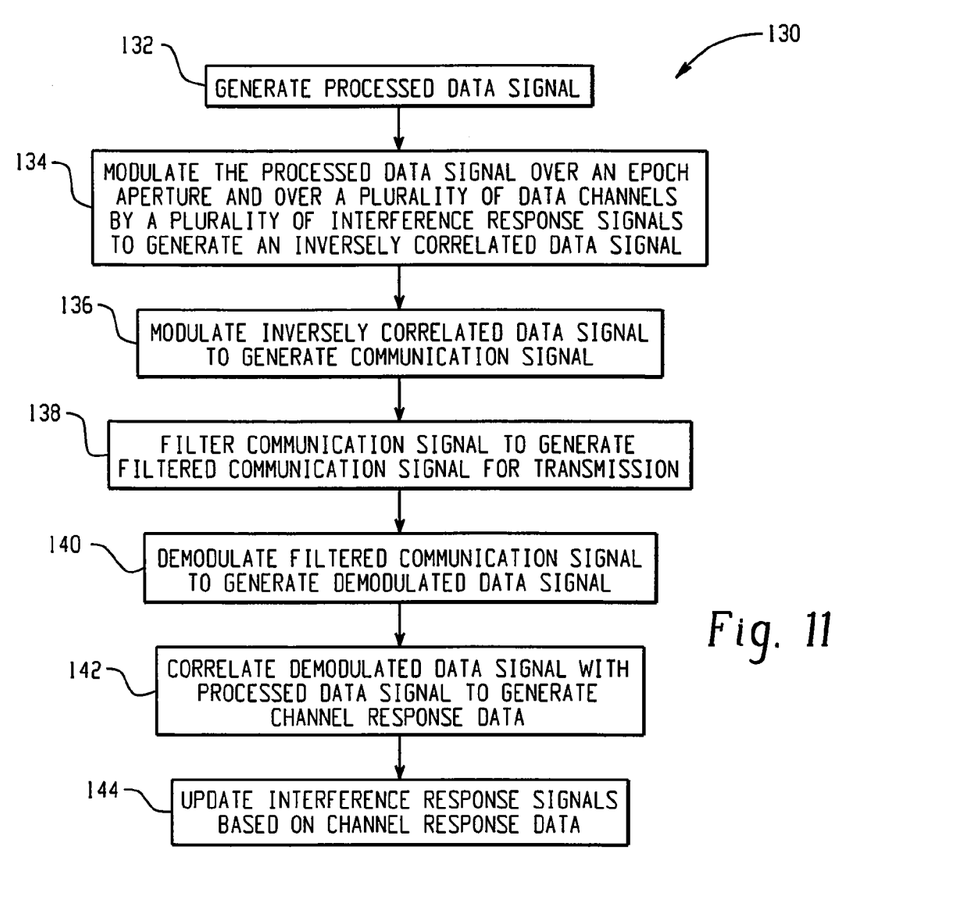
FIG. 11 a flow diagram illustrating a method of generating interference response signals carried out by the system of FIG. 10.

FIG. 11 a flow diagram 130 illustrating a method of generating interference response signals carried out by the system of FIG. 10. In step 132, the channel modulator generates a processed data signal. In step 134, the correlation canceller 60 modulates the processed data signal over an epoch aperture and over a plurality of data channels by a plurality of interference response signals to generate an inversely correlated data signal. In one embodiment, upon system initiation, the interference response signals are set to 0 for all channels except for the data channel, which is set to 1. Accordingly, the correlation canceller 60 initially passes the processed data signal unchanged.

In step 136, the inversely correlated data signal is modulated by the carrier modulator to generate a communication signal, and in step 138 the communication signal is filtered by the digital filter 16 to generate a filtered communication signal for transmission. The filtered communication signal may also be provided to a carrier demodulator 18, which demodulates the filtered communication signal to generate a demodulated data signal, in accordance with step 140.

In step 142, the demodulated data signal is correlated with the processed data signal by the epoch aperture correlator 62. The correlation of the processed data signal with the demodulated data signal over the epoch aperture generates a plurality of corresponding channel response data that are indicative of the self-interference cause by the digital filter 16. In one embodiment, the epoch aperture correlator 62 correlates over a given set of received symbols or over a given time period, e.g., 1,000,000 symbols, or every second.

In step 144, the interference response signals stored in the correlation canceller are updated based on the channel response data. An interference response signal generator 64 may be configured to invert the channel response signals to generate the interference response signals as described above with reference to FIGS. 3-9. In one embodiment, the interference response signal generator 64 is configured to periodically update the interference response signals used by the correlation canceller 60 based on the output frequency of the epoch aperture correlator 62, e.g., every 1,000,000 symbols, or every second.

In another embodiment, the epoch aperture correlator 62 performs an autocorrelation on the demodulated data signal over the epoch aperture, and does not correlate the demodulated data signal with the processed data signal. The autocorrelation on the demodulated data signal over the epoch aperture yields channel response data that is indicative of the self-interference caused by the digital filter 16, albeit the channel response data may be less accurate than if such data were obtained by a correlation of the processed data signal and the demodulated data signal.

The epoch aperture correlator 62 and the interference response signal generator 64 may comprise digital signal processing circuitry and/or software operable to perform the operations described herein. Examples of such circuitry and/or software include a FPGA, an ASIC, or a computer processor operable to execute processor-executable instructions.

The systems and methods described herein may be implemented in a transmitting device, such as in a satellite communication system uplink. Alternatively, the system may be distributed over a plurality of locations. For example, if a satellite downlink filter characteristic is known, a processed data signal may be conditioned as described herein prior to transmission to the satellite according to the interference response signals corresponding to the satellite downlink filter characteristics.

While the example systems and methods herein have been described with respect to applications for digital filtering and signal processing, the systems and methods described herein may also be applied to analog systems or digital systems with analog processing stages. Additionally, the system and methods described herein may also be applied to provide a priori conditioning for other linear system responses in addition to or separate from the linear system response of a filtering device. For example, a linear system response as measured from the output of the correlation canceller to the demodulated communication signal may be evaluated to generate corresponding interference response signals for use in the correlation canceller.

The embodiments described herein are examples of structures, systems or methods having elements corresponding, either literally or equivalently, to the elements of the invention recited in the claims. Additionally, the flow diagrams described herein, which describe particular methods and/or corresponding acts in support of steps, may also be utilized to implement corresponding software structures and algorithms, and equivalents thereof.

What is claimed is:

1. A method of a priori conditioning of a communication signal having a plurality of channels, the method comprising:
   digitally filtering a first processed data signal transmitted over one of the plurality of channels;
   monitoring, with an interference response signal generator unit, the remaining plurality of channels to estimate channel response signals resulting from the digital filtering of the first processed data signal over the one of the plurality of channels;
   generating, with the interference response signal generator unit, interference response signals based at least in part on the channel response signals, the interference response signals corresponding to at least a subset of the plurality of channels; and
   modulating, with a correlation canceller unit, a second processed data signal by the interference response signals to produce the communication signal.

2. The method of claim 1, wherein the generating interference response signals step comprises inverting the estimated channel response signals to obtain the interference response signals corresponding to the plurality of channels.

3. The method of claim 2, wherein the inverting of the estimated channel response signals to obtain interference response signals comprises multiplying each channel response signal by a negative value.

4. The method of claim 1, wherein the digital filtering of the first processed data signal comprises digital filtering of a known data signal comprising a test tone.

5. The method of claim 1, further comprising:
transmitting at least one of a known in-phase or quadrature data signal over the one of the plurality of channels in the first processed data signal.

6. The method of claim 1, wherein,
the monitoring step is performed over an epoch aperture; and
the interference response signals are based on the channel response signals monitored over the epoch aperture.

7. The method of claim 1, further comprising:
estimating additional channel response signals resulting from digital filtering of additional processed data signals over each of the remaining plurality of channels;
generating additional interference response signals based at least in part on the additional channel response signals, the additional interference response signals corresponding to the plurality of channels; and
combining the interference response signals with the additional interference response signals,
wherein the modulating the second processed data signal by the interference response signals comprises modulating the second processed data signal by the combined signals.

8. The method of claim 1, further comprising:
digitally filtering the modulated second processed data signal;
monitoring the remaining plurality of channels to estimate channel response signals resulting from the digital filtering of the modulated second processed data signal; and
updating the generated interference response signals based on the estimated channel response signals resulting from the digital filtering of the modulated second processed data signal.

9. The method of claim 1, wherein,
the digital filtering step is performed with a finite impulse response (FIR) filter;
the generating step and the modulating step are performed using at least one of a field programmable gate array (FPGA) or an application specific integrated circuit (ASIC);
the communication signal comprises an orthogonal frequency digitally multiplexed (OFDM) signal; and
the channel response signals comprise complex values.

10. A device for a priori conditioning of a communication signal having a plurality of channels, comprising:
interference response signal generation processing circuitry operable to:
monitor the plurality of channels to obtain channel response signals comprising an estimate of a digital filter transfer function resulting from digital filtering of a known data signal; and
generate interference response signals based on the channel response signals, the interference response signals corresponding to the plurality of channels;
channel modulator processing circuitry operable to modulate received data over a plurality of channels to generate a processed data signal having a corresponding plurality of communication channels;
correlation canceller processing circuitry operable to modulate the processed data signal over the plurality of channels with the interference response signals the correlation canceller unit modulation generating an inversely correlated data signal; and
digital filter processing circuitry operable to filter the inversely correlated data signal to generate a filtered communication signal.

11. The device of claim 10 wherein the interference response signal generation processing circuitry is configured to generate the interference response signals by inverting the channel response signals.

12. The device of claim 10 wherein the digital filter processing circuitry is further configured to digitally filter the known data signal comprising a test tone to generate the channel response signals.

13. The device of claim 10, wherein the estimate of a digital filter transfer function is calculated by separately evaluating in-phase and quadrature data signals comprising real values.

14. The device of claim 10, further comprising:
carrier modulator processing circuitry operable to modulate the inversely correlated data signal before the digital filter operates to filter the inversely correlated data signal.

15. The device of claim 10, wherein,
the digital filter processing circuitry comprises a finite impulse response (FIR) filter;
the device comprises at least one of a field programmable gate array (FPGA) or an application specific integrated circuit (ASIC); and
the communication signal comprises an orthogonal frequency digitally multiplexed (OFDM) signal.

16. A method of a priori conditioning of a communication signal having a plurality of channels, the method comprising:
receiving a data signal;
modulating, with a modulator unit, the data signal over the plurality of channels to generate a processed data signal having corresponding plurality of communication channels;
modulating, with a correlation canceller unit, the processed data signal over the plurality of channels with interference response signals comprising an inverse of a digital filter transfer function to generate an inversely correlated data signal; and
digitally filtering, with a digital filter unit, the inversely correlated data signal according to the digital filter transfer function to generate the communication signal.

17. The method of claim 16, further comprising:
monitoring the plurality of channels to obtain channel response signals resulting from digital filtering of a known data signal; and
generating the interference response signals based on the channel response signals, the interference response signals corresponding to the plurality of channels.

18. The method of claim 17, further comprising:
digitally filtering the known data signal to generate channel response signals, wherein the known data signal comprises a test tone.

19. The method of claim 17, further comprising:
generating the interference response signals by inverting the channel response signals.

20. The method of claim 16, further comprising:
estimating the digital filter transfer function by separately evaluating in-phase and quadrature data signals.

21. The method of claim 16, further comprising:
modulating the inversely correlated data signal with a carrier modulator unit before the digital filter unit operates to filter the inversely correlated data signal.

22. A method of generating interference response signals for a priori conditioning of a communication signal having a plurality of channels, the method comprising:
monitoring, with an interference response signal generator unit, a first subset of the plurality of channels to identify interference data comprising channel response signals resulting from a digital filtering of a known data signal over a first one of the plurality of channels;

performing, with an interference response signal generator unit, an inversion operation on the identified interference data to generate a set of corresponding interference response signals; and modulating, with a correlation canceller unit, a processed data signal by the interference response signals to produce the communication signal.

23. The method of claim 22, further comprising:

modulating a received data signal over the plurality of channels to generate processed data signal having a corresponding plurality of communication channels.

* * * * *